United States Patent
Yoshitake et al.

(10) Patent No.: US 11,164,274 B2
(45) Date of Patent: Nov. 2, 2021

(54) ARTICLE CONVEYANCE SYSTEM AND ARTICLE CONVEYANCE METHOD

(71) Applicant: HITACHI INDUSTRIAL PRODUCTS, LTD., Tokyo (JP)

(72) Inventors: Hiroshi Yoshitake, Tokyo (JP); Ryota Kamoshida, Tokyo (JP); Yoshikazu Nagashima, Tokyo (JP); Masaharu Kondou, Tokyo (JP)

(73) Assignee: HITACHI INDUSTRIAL PRODUCTS, LTD., Tokyo (JP)

( * ) Notice: Subject to any disclaimer, the term of this patent is extended or adjusted under 35 U.S.C. 154(b) by 127 days.

(21) Appl. No.: 16/783,957

(22) Filed: Feb. 6, 2020

(65) Prior Publication Data
US 2020/0273132 A1     Aug. 27, 2020

(30) Foreign Application Priority Data

Feb. 22, 2019   (JP) .............................. JP2019-030870

(51) Int. Cl.
*G06Q 50/28* (2012.01)
*B65G 1/137* (2006.01)

(52) U.S. Cl.
CPC .......... *G06Q 50/28* (2013.01); *B65G 1/1378* (2013.01)

(58) Field of Classification Search
CPC combination set(s) only.
See application file for complete search history.

(56) References Cited

U.S. PATENT DOCUMENTS

| | | | |
|---|---|---|---|
| 8,527,325 B1* | 9/2013 | Atreya | G06Q 10/08 705/7.38 |
| 8,565,913 B2* | 10/2013 | Emanuel | G06Q 10/087 700/229 |
| 10,029,787 B1* | 7/2018 | Lesser | G06Q 10/0832 |
| 2009/0185884 A1* | 7/2009 | Wurman | B65G 1/1373 414/270 |
| 2010/0312860 A1* | 12/2010 | Lohstoeter | G06Q 10/08 709/219 |
| 2011/0061992 A1* | 3/2011 | Wunsche | B65G 1/1378 198/347.1 |
| 2011/0145032 A1* | 6/2011 | Stearns | G06Q 10/06 705/7.13 |
| 2018/0025460 A1* | 1/2018 | Watanabe | G06Q 10/047 705/28 |
| 2020/0307910 A1* | 10/2020 | Jungbluth | G05B 15/02 |
| 2021/0158466 A1* | 5/2021 | Li | G06Q 10/06393 |

FOREIGN PATENT DOCUMENTS

JP     2014-224000 A    12/2014

* cited by examiner

*Primary Examiner* — Kyle O Logan
(74) *Attorney, Agent, or Firm* — Volpe Koenig

(57) ABSTRACT

An article conveyance system includes: a processor; and a storage device accessed by the processor, in which the processor calculates a conveyance time until a conveyance device conveys a shelf being a target for work of taking out or storing an article to a work place where the work on the shelf is performed and a work time until work scheduled to be performed at the work place is ended; and the processor determines whether or not to add an instruction to cause the conveyance device to convey the shelf to the work place based on a difference between the conveyance time and the work time.

14 Claims, 12 Drawing Sheets

FIG. 6

| ID | ARTICLE NAME | NUMBER OF ARTICLES | STORAGE SHELF | STORAGE OPENING STAGE | STORAGE OPENING ROW | SORTING SHELF | SORTING OPENING STAGE | SORTING OPENING ROW | SHIPPING BOX |
|---|---|---|---|---|---|---|---|---|---|
| 1 | A | 10 | DS1 | 1 | 1 | SS1 | 1 | 1 | SH01 |
| 2 | B | 15 | DS1 | 1 | 2 | SS1 | 4 | 2 | SH02 |
| 3 | C | 20 | DS1 | 1 | 3 | SS2 | 3 | 4 | SH03 |
| 4 | D | 5 | DS1 | 2 | 1 | SS3 | 2 | 2 | SH04 |
| 5 | E | 30 | DS1 | 2 | 2 | SS5 | 1 | 3 | SH06 |
| 6 | E | 10 | DS1 | 2 | 3 | SS5 | 2 | 3 | SH06 |
| 7 | F | 15 | DS1 | 1 | 1 | SS5 | 2 | 1 | SH07 |
| 8 | G | 10 | DS1 | 2 | 1 | SS6 | 1 | 2 | SH08 |
| 9 | A | 15 | DS2 | 1 | 1 | SS6 | 3 | 1 | SH09 |
| 10 | H | 10 | DS2 | 1 | 1 | SS7 | 1 | 1 | SH10 |
| ... | | | | | | | | | |

*FIG. 7*

|  | | ESTIMATED CONVEYANCE COMPLETION TIME | |
| --- | --- | --- | --- |
|  | | DS1: 20 seconds | DS2: 50 seconds |
| ESTIMATED REMAINING WORK TIME | 100 seconds | | |
| | 60 seconds | | ✓ |
| | 0 seconds | ✓ | |

FIG. 11

| | | ESTIMATED CONVEYANCE COMPLETION TIME | | | |
| --- | --- | --- | --- | --- | --- |
| | | DS1: 20 seconds | | DS2: 50 seconds | |
| | | SS1: 10 seconds | SS2: 90 seconds | SS1: 10 seconds | SS2: 90 seconds |
| ESTIMATED REMAINING WORK TIME | 100 seconds | | | | ✓ |
| | 60 seconds | | | ✓ | |
| | 0 seconds | ✓ | | | |

ARTICLE CONVEYANCE SYSTEM AND ARTICLE CONVEYANCE METHOD

CLAIM OF PRIORITY

The present application claims priority from Japanese patent application JP 2019-030870 filed on Feb. 22, 2019, the content of which is hereby incorporated by reference into this application.

BACKGROUND OF THE INVENTION

1. Field of the Invention

The present invention relates to techniques of a conveyance system and a conveyance method for conveying an article in a warehouse, a factory, and the like.

2. Description of the Related Art

In distribution warehouses and factories, an operation in which a worker collects an article stored in a site according to a delivery order and sorts the articles to a shipping destination, that is, a picking work is performed. As an example of picking work, a picking system by an automatic conveyance vehicle in which the automatic conveyance vehicle conveys a storage shelf in which stored articles are stored to a work station at which the worker stays, and picks an article corresponding to the delivery order from the conveyed storage shelf is operated.

For example, JP 2014-224000 A discloses a technique for performing a picking system by an automatic conveyance vehicle. When the automatic conveyance vehicle conveys a storage shelf to the worker's place, the automatic conveyance vehicle goes directly under the storage shelf to be conveyed. Then, the automatic conveyance vehicle lifts the lowest stair tread of the storage shelf from the bottom, so that the entire storage shelf is lifted up and conveyed with the legs of the storage shelf lifted. A worker waits for the arrival of the storage shelf at a work station where an article is taken out. After the storage shelf arrives at the work station, the worker takes out the article of the item described in the delivery order, and loads the specified number of articles to a position corresponding to a shipping destination associated with the delivery order of a compartment or a small box divided for each shipping destination. In this manner, the picking work for each delivery order is performed. The storage shelf for which the picking work has been completed is carried out from the work station again by the automatic conveyance vehicle.

SUMMARY OF THE INVENTION

However, JP 2014-224000 A has the following problems, for example. When the storage shelf is conveyed to the work station, if the moving time of the shelf that can arrive the earliest is later than the remaining work time until the completion of the picking work for another storage shelf that is performed earlier in the work station as a conveyance destination, the worker in the work station as a conveyance destination cannot perform the picking work until the storage shelf arrives after the previous picking work is completed, and thus a waiting time is caused. In addition, when a shelf whose arrival time is earlier than the remaining work time of the work station is conveyed, the storage shelf that has arrived around the work station as a conveyance destination waits for completion of picking work performed in the work station as a conveyance destination or completion of picking work of another storage shelf that has arrived earlier.

In this way, when an automatic conveyance vehicle that is conveying the storage shelf stays in a path where the automatic conveyance vehicle around the work station as a conveyance destination can move, passage of the another conveyance vehicle that is moving is hindered by the storage shelf and the automatic conveyance vehicle conveying the storage shelf to cause traffic jams and delays in conveying the storage shelf to another work station, thereby causing waiting time for a worker until arrival of the storage shelf at another work station.

Such occurrence of the arrival waiting time of the storage shelf in the work station leads to a reduction in the amount of picking work of the entire system per unit time, and reduces work efficiency of the picking system by the automatic conveyance vehicle. In order to prevent this, it is desirable that the timing at which the storage shelf conveyed by the automatic conveyance vehicle arrives at the work station is a timing at which a time for the worker in the work station as a conveyance destination to wait for the start of the picking work on the storage shelf is not caused and a time for the storage shelf to wait for completion of the picking work on another storage shelf in the work station as a conveyance destination is not caused.

In order to solve at least one of the above-described problems, according to the present invention, there is provided an article conveyance system including: a processor; and a storage device accessed by the processor, in which the processor calculates a conveyance time until a conveyance device conveys a shelf being a target for work of taking out or storing an article to a work place where the work on the shelf is performed and a work time until work scheduled to be performed at the work place is ended; and the processor determines whether or not to add an instruction to cause the conveyance device to convey the shelf to the work place based on a difference between the conveyance time and the work time.

According to one aspect of the present invention, it is possible to reduce both the waiting time caused on the worker until the start of the picking work of the storage shelf when the storage shelf has not arrived at the work station at which the picking work is scheduled to be performed, and the waiting time until the picking work is started on the storage shelf that has arrived at the work station at which the picking work is scheduled to be performed, so that the work efficiency of the entire picking system can be improved.

Problems, configurations, and effects other than those described above will be clarified by the following description of embodiments.

BRIEF DESCRIPTION OF THE DRAWINGS

FIG. 6 is an explanatory diagram showing an example of conveyance and picking instruction data of storage shelves and sorting shelves of a picking work in the first embodiment of the present invention;

FIG. 7 is an explanatory diagram showing an example of determination of the storage shelf to be conveyed based on an estimated remaining work time of the picking work in the work station and an estimated conveyance completion time by an automatic conveyance vehicle of the storage shelf as a conveyance candidate according to the first embodiment of the present invention;

FIG. 11 is an explanatory diagram showing an example of determination of the storage shelf and the sorting shelf to be conveyed based on an estimated remaining work time of the picking work in the work station and an estimated conveyance completion time by an automatic conveyance vehicle of the storage shelf and the sorting shelf as conveyance candidates according to the second embodiment of the present invention.

DESCRIPTION OF THE PREFERRED EMBODIMENTS

Next, embodiments of the present invention will be described in detail with reference to the drawings as appropriate.

First Embodiment

Figure 1:
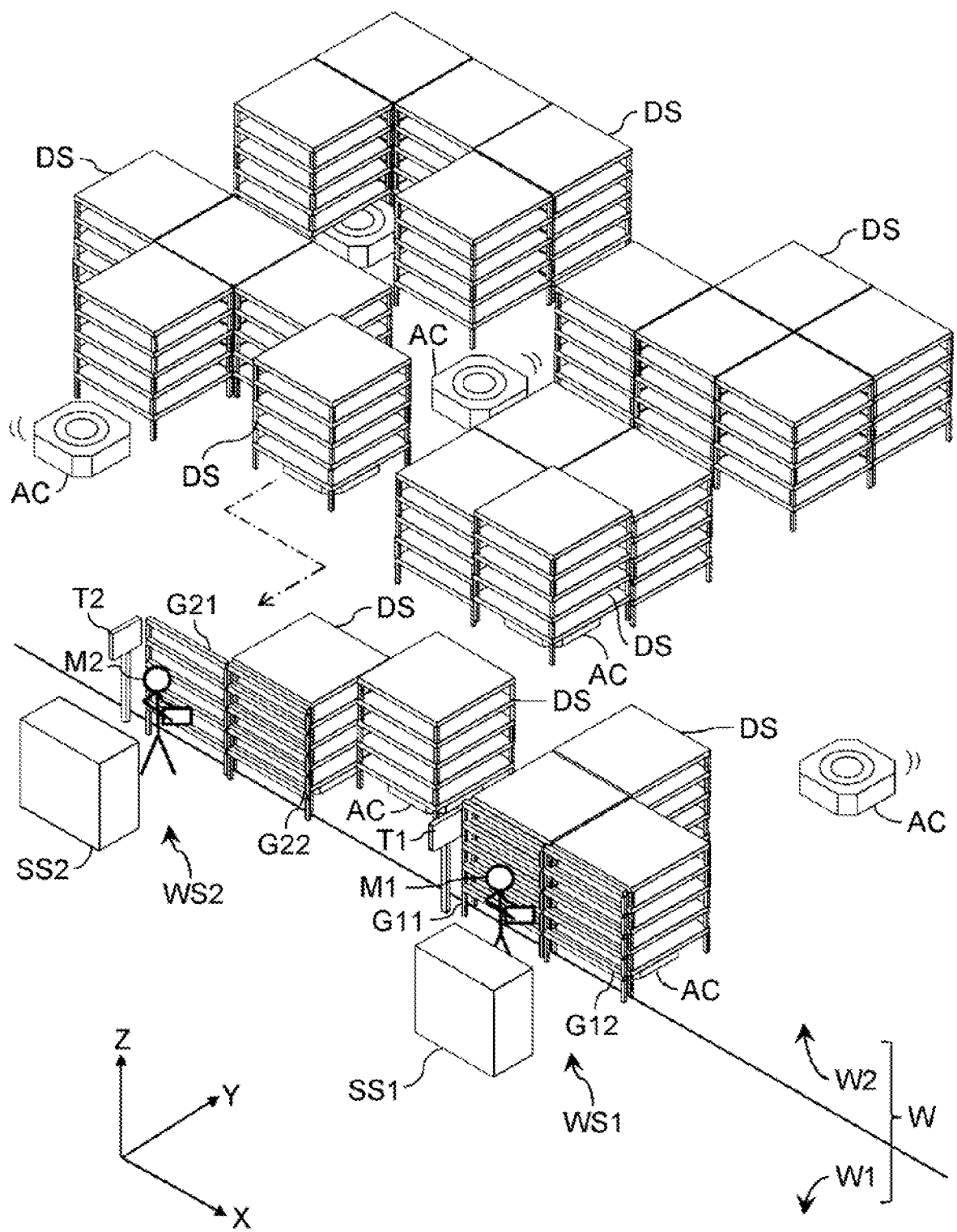
FIG. 1 is an overall schematic view of a conveyance system according to a first embodiment of the present invention.

FIG. 1 is an overall schematic view of a conveyance system according to a first embodiment of the present invention.

A warehouse W has a work area W1 and an article storage area W2. A plurality of storage shelves DS are arranged in the storage area W2. Each storage shelf DS stores one or more types of articles. In the storage area W2, there are a plurality of automatic conveyance vehicles AC. Here, the automatic conveyance vehicle AC has a function of conveying the storage shelf DS.

The floor surface of the storage area W2 is divided by, for example, a two-dimensional grid, and a WMS 401 and an operation management device 403 shown in FIG. 3 to be described later manage the positions of the automatic conveyance vehicles AC and the storage shelves DS based on the coordinate value of the center of each grid (that is, a rectangular section). In addition, the locations may be managed not with the center coordinate value of the grid but with a vertex coordinate value. Each grid has a coordinate marker including the coordinate value of the grid. The coordinate marker is, for example, a barcode (including a two-dimensional code) attached to or applied on the grid. The barcode is information including the coordinate value of the grid.

In the work area W1, there are a plurality of work stations WSi including those indicated by reference numerals WS1 and WS2. In the present embodiment, since the picking work is performed in the work station WSi, the work station may be called a picking station.

Here, i is the number of the work station WS, and is an integer satisfying $1 \leq i \leq n$. Also, n is an integer of 2 or more, and indicates the total number of work stations WS. In this example, n=2.

For example, when the work stations WSi are not distinguished, for example, when the description is common to all the work stations WSi, the work stations WSi are appropriately referred to as work stations WS. The work station WSi has a gate Gij, a terminal Ti, and a sorting shelf SSi. Here, i is the number of the work station WS. Further, j of the gate Gij is an integer satisfying $1 \leq j \leq m$, and is the number of the gates G installed in each work station WS. In the present embodiment, m=2.

That is, in each work station WSi, one terminal Ti, a sorting shelf SSi, and m gates G are installed. When individual gates Gij, terminals Ti, and sorting shelves SSi are not distinguished, they are appropriately referred to as gates G or gates Gij, terminals T or terminals Ti, and sorting shelves SS or sorting shelves SSi. The gate Gij is the arrival point of the storage shelf DS. One gate Gij corresponds to one storage shelf DS. On the terminal Ti, a list of sorting destinations of articles (information on correspondence between articles and sorting shelf sections of the sorting shelf SSi) is displayed.

The sorting shelf SSi provided in the work station WSi is a shelf on which an article picked from the storage shelf DS via the gate Gij is placed. Here, i of a worker Mi is the number of the work station WS, and is an integer satisfying $1 \leq i \leq n$. Also, n is an integer of 2 or more, and indicates the total number of work stations WS. In this example, n=2. When the workers Mi are not distinguished, they are appropriately referred to as workers M or workers Mi.

The automatic conveyance vehicle AC conveys the storage shelf DS according to the following procedure. First, the automatic conveyance vehicle AC moves to the position of the designated storage shelf DS. The automatic conveyance vehicle AC goes under the designated storage shelf DS and lifts the storage shelf DS directly above by a jack mechanism (not shown) provided on the upper surface of the automatic conveyance vehicle AC upon receiving lift-up instruction information from the operation management device 403 shown in FIG. 3. Thereafter, the automatic conveyance vehicle AC moves to the designated work station WS in the work area W1 while lifting the storage shelf DS. The automatic conveyance vehicle AC lowers the storage shelf DS to the floor when arriving at the work station WS. When the picking work by the worker M is completed, the automatic conveyance vehicle AC lifts the storage shelf DS again and returns the storage shelf DS to the original position.

Figure 2:
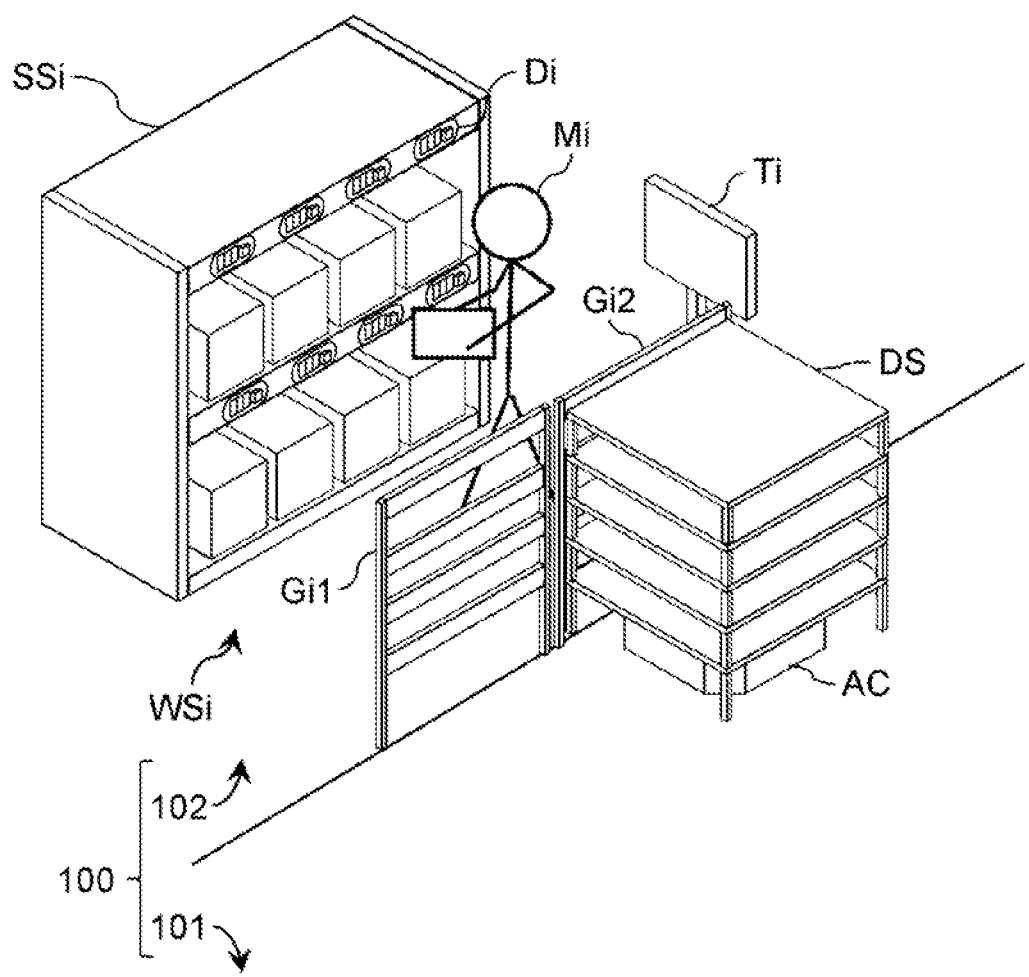
FIG. 2 is an explanatory diagram showing details of a work station of the conveyance system according to the first embodiment of the present invention.

FIG. 2 is an explanatory diagram showing details of the work station WSi of the conveyance system according to the first embodiment of the present invention.

FIG. 2 shows the state where the storage shelf DS conveyed by the automatic conveyance vehicle AC arrives at the work station WSi, and the worker Mi performs an operation of picking the article stored in the storage shelf DS through a gate Gi2 and storing the article in the sorting shelf SSi.

The sorting shelf SSi may be provided with a plurality of stages in the vertical direction, and each stage may be divided into a plurality of rows in the left-right direction. For example, according to the list displayed on the terminal Ti, the worker Mi stores the article picked from the storage shelf DS in the corresponding section of the sorting shelf SSi. Each section of the sorting shelf SSi is identified by, for example, a stage and the number of the row. As an example, each section is displayed with a number identifying the section. In that case, the worker Mi identifies the storage destination with reference to the displayed number. Alternatively, each section may be provided with a display device Di that indicates whether or not it is a storage destination of the article. In that case, according to the list displayed on the terminal Ti and the progress status of the picking work, the display device Di of the section of a storage destination of a next picked article may operate, and the worker Mi may store the picked article in the section corresponding to the operated display device Di, for example, with reference to the display.

Note that only articles of one item may be stored in one storage shelf DS, but in general, articles of a plurality of items are stored. Specifically, each storage shelf DS may have a plurality of storage sections, and articles of one item may be stored in one storage section. The storage section is an area where an article can be stored in the storage shelf DS, and is also called a compartment. For example, one storage shelf DS may be divided into a plurality of section stages in the vertical direction, and each section stage may be further divided into a part close to one side of the storage shelf DS and a part close to the other side. Each part may be further divided into a plurality of section rows in the left-right direction, and each section row may be defined as one storage section.

For example, the interior of the storage shelf DS shown in FIG. 2 is divided into four section stages. Each section stage is divided into a part close to the side facing the gate Gi2 and a part close to the opposite side, and each part of each shelf may be further divided into a plurality of section rows in the left-right direction. A part close to each side of the storage shelf DS is also referred to as a shelf surface in the following description.

(Example of Conveyance System)

Figure 3:
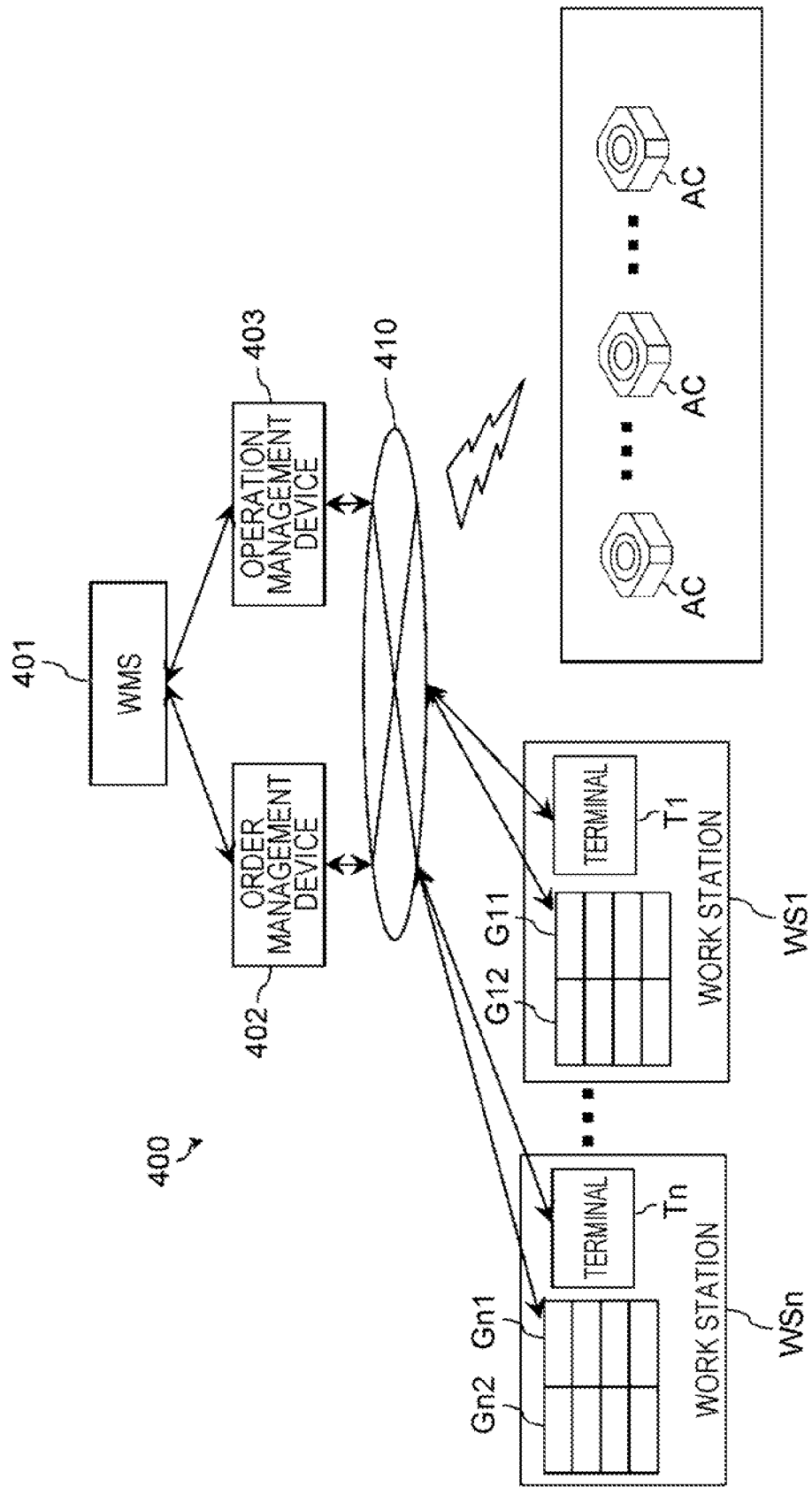
FIG. 3 is a functional block diagram showing an overall configuration of the conveyance system according to the first embodiment of the present invention.

FIG. 3 is a functional block diagram showing the overall configuration of the conveyance system according to the first embodiment of the present invention.

A conveyance system 400 includes a WMS (Warehouse Management System) 401, an order management device 402, an operation management device (control unit) 403, the automatic conveyance vehicle AC, the terminal Ti, a gate control device (not shown), and the gate Gij. The WMS 401 is connected to the order management device 402 and the operation management device 403 so as to communicate with each other. The order management device 402, the operation management device 403, the automatic conveyance vehicle AC, the terminal Ti, and a gate control device Gc are connected to each other via a network 410 so as to communicate with each other. At least the automatic conveyance vehicle AC is connected to the operation management device 403 via the network 410 so as to wirelessly communicate with each other.

The WMS 401 controls the order management device 402 and the operation management device 403. Specifically, the WMS 401 transmits the order and warehousing data to the storage shelf to the order management device 402. The order is information including the article name, the number, and the delivery destination of an article to be picked. The warehousing data to the storage shelf is data related to the storage shelf DS in which articles are stored. Specifically, the warehousing data to the storage shelf includes, for example, the article name and number of an article stored in each storage shelf DS, identification information of the storage shelf DS in which the article is stored, and the position information of the storage section (compartment) in which the article is stored (for example, identification information of a shelf surface, a section stage, and a section row to which the storage section belongs).

Further, the WMS 401 links the processing in the order management device 402 and the processing in the operation management device 403. For example, when the WMS 401 receives a notice of completion of the picking work for the article by the worker M (see FIG. 1) from the order management device 402, the WMS 401 instructs the operation management device 403 to return the storage shelf DS to the original position.

The operation management device 403 manages the operation of the automatic conveyance vehicle AC (for example, conveyance of the storage shelf DS by the automatic conveyance vehicle AC). The automatic conveyance vehicle AC includes a reading device (not shown) such as a visible light camera or an infrared camera at the bottom of the vehicle body, and scans the floor surface during movement. For example, when the coordinate marker on the floor surface is a barcode, the reading device is a barcode reader. Then, when the reading device scans the barcode indicating the coordinate value at the time of passing through the grid provided with the coordinate marker, the automatic conveyance vehicle AC acquires the coordinate value. The automatic conveyance vehicle AC transmits the acquired coordinate value to the operation management device 403. With this, the operation management device 403 manages the current position of each automatic conveyance vehicle AC.

When the operation management device 403 receives the conveyance instruction information of the storage shelf DS from the order management device 402 via the WMS 401, the operation management device 403 specifies the storage shelf DS that stores the article to be delivered and the work station WSi having the sorting shelf SSi having the sorting shelf section of the delivery destination of the article to be delivered. Then, the position of the specified storage shelf DS is acquired, and route information from the position to the position of the specified work station WSi is generated. At this time, the operation management device 403 transmits route information to a certain automatic conveyance vehicle AC, for example, the automatic conveyance vehicle AC closest to the specified storage shelf DS, and instructs the automatic conveyance vehicle AC to move according to the route information.

Figure 4A:
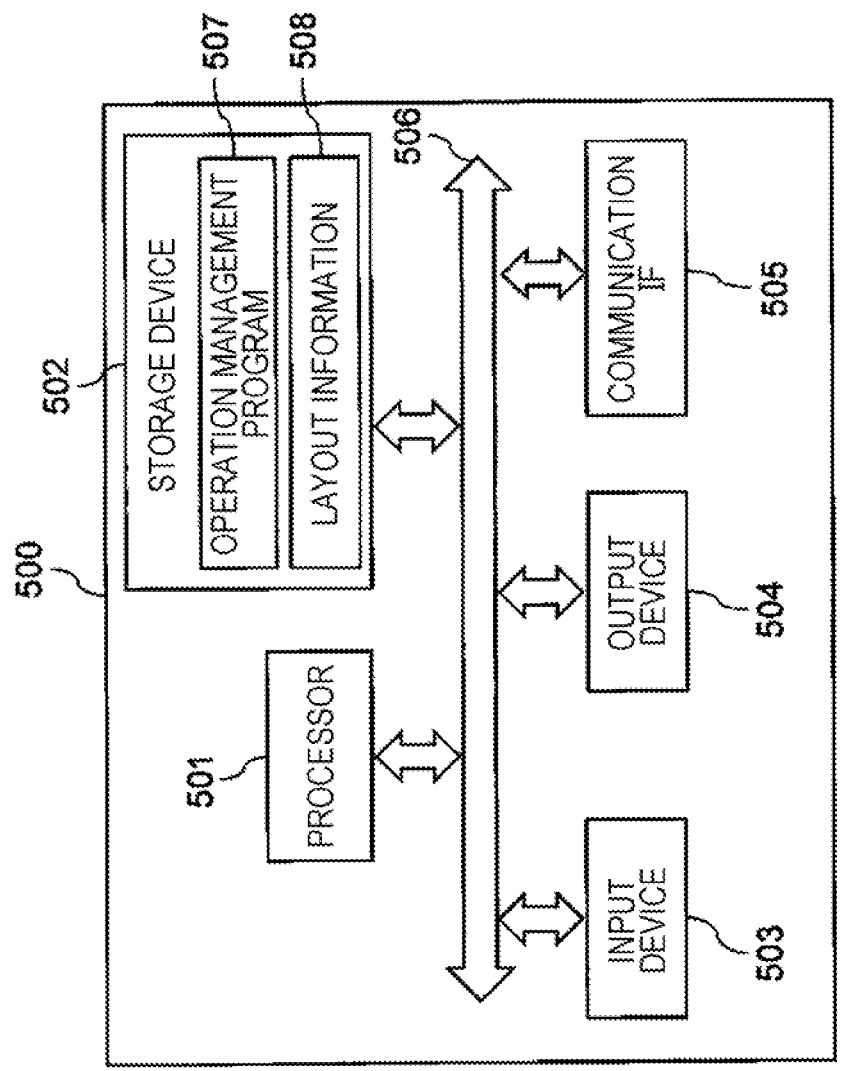
FIGS. 4A and 4B are block diagrams showing a hardware configuration example of an operation management device and an order management device according to the first embodiment of the present invention.
Figure 4B:
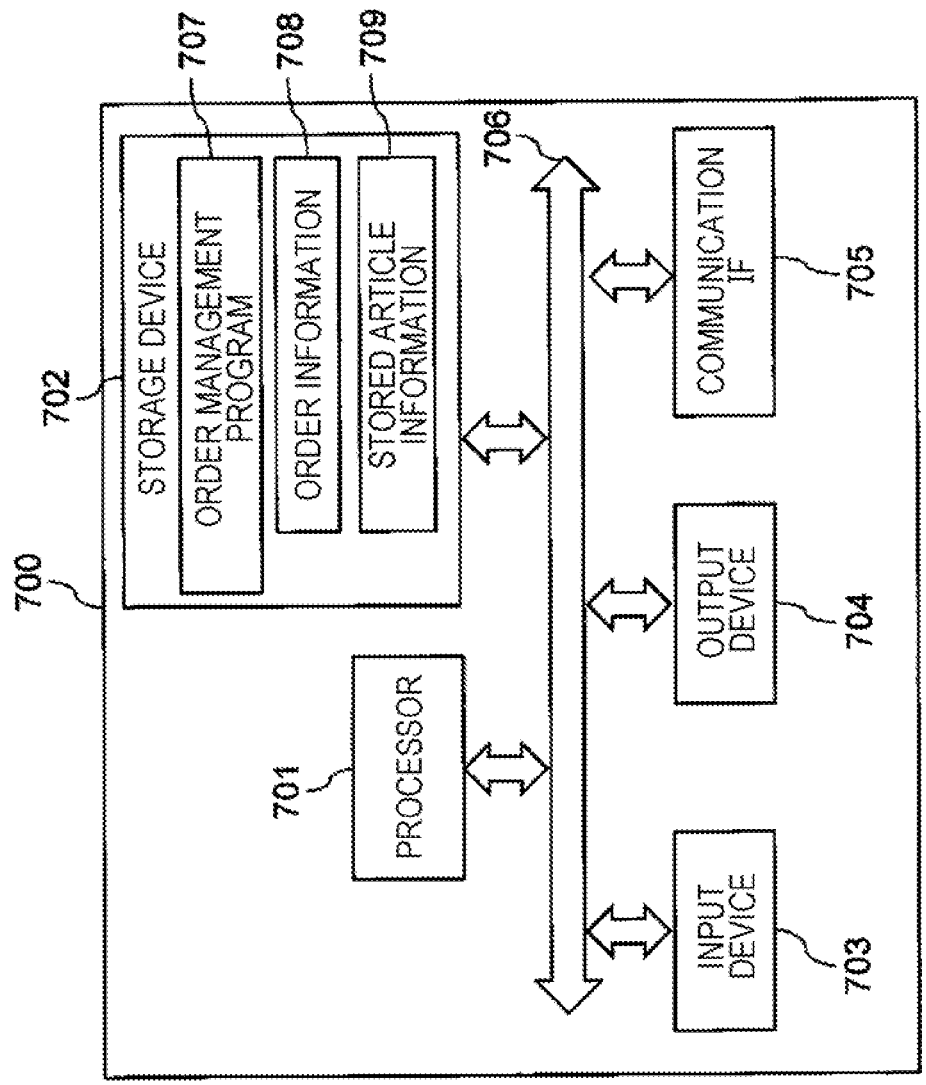

FIG. 4A is a block diagram showing a hardware configuration example of the operation management device 403 according to the first embodiment of the present invention, and FIG. 4B is a block diagram showing a hardware configuration example of the order management device 402 according to the first embodiment of the present invention.

The operation management device 403 of the present embodiment can be realized by hardware of a computer 500 shown in FIG. 4A. The computer 500 includes a processor 501, a storage device 502, an input device 503, an output device 504, and a communication interface (communication IF) 505. The processor 501, the storage device 502, the input device 503, the output device 504, and the communication IF 505 are connected by a bus 506.

The processor 501 controls the computer 500. The storage device 502 serves as a work area for the processor 501. The storage device 502 is a non-transitory or transitory recording medium that stores various programs and data. Examples of the storage device 502 include a ROM (Read Only Memory), a RAM (Random Access Memory), an HDD (Hard Disk Drive), and a flash memory.

An operation management program 507 and layout information 508 are stored in the storage device 502 of the computer 500 used as the operation management device 403 of the present embodiment. The processing executed by the operation management device 403 in the present embodiment is actually executed by the processor 501 controlling the input device 503, the output device 504, the communication interface 505, and the like as necessary according to the operation management program 507.

The layout information 508 includes at least information related to the arrangement of various objects existing in the storage area W2. For example, the layout information 508 may include the position of each storage shelf DS in the storage area W2, the direction of each storage shelf (that is, which shelf surface is directed in which direction), the article stored in each storage section of each storage shelf, the position of each automatic conveyance vehicle AC, the position of the gate G, the direction of the gate G, and the route along which the automatic conveyance vehicle AC that lifts the storage shelf DS can move.

The input device 503 inputs data. Examples of the input device 503 include a keyboard, a mouse, a touch panel, a numeric keypad, and a scanner. The output device 504 outputs data. Examples of the output device 504 include a display and a printer. The communication IF 505 is connected to the network 410 to transmit and receive data.

The order management device 402 of the present embodiment can be realized by hardware of a computer 700 shown in FIG. 4B. The computer 700 includes a processor 701, a storage device 702, an input device 703, an output device 704, and a communication interface (communication IF) 705. The processor 701, the storage device 702, the input device 703, the output device 704, and the communication IF 705 are connected by a bus 706.

The processor 701 controls the computer 700. The storage device 702 serves as a work area for the processor 701. The storage device 702 is a non-transitory or transitory recording medium that stores various programs and data. Examples of the storage device 702 include a ROM (Read Only Memory), a RAM (Random Access Memory), an HDD (Hard Disk Drive), and a flash memory.

An order management program 707, order information 708, and stored article information 709 are stored in the storage device 702 of the computer 700 used as the order management device 402 of the present embodiment. The processing executed by the order management device 402 in the present embodiment is actually executed by the processor 701 controlling the input device 703, the output device 704, the communication interface 705, and the like as necessary according to the order management program 707.

The order information 708 includes at least information on articles and delivery destinations related to shipment, warehousing, and delivery of various articles. For example, the order information 708 may include information on the type, the article number, the article name, and the store name and address of the shipping destination of the article picked among the articles stored in this system to be shipped, information on the type, the article number, and the article name of the article to be warehoused in the storage shelf of this system, and information on the shelf ID, the shelf surface, and the compartment of the storage shelf that performs picking in the delivery.

Figure 5:
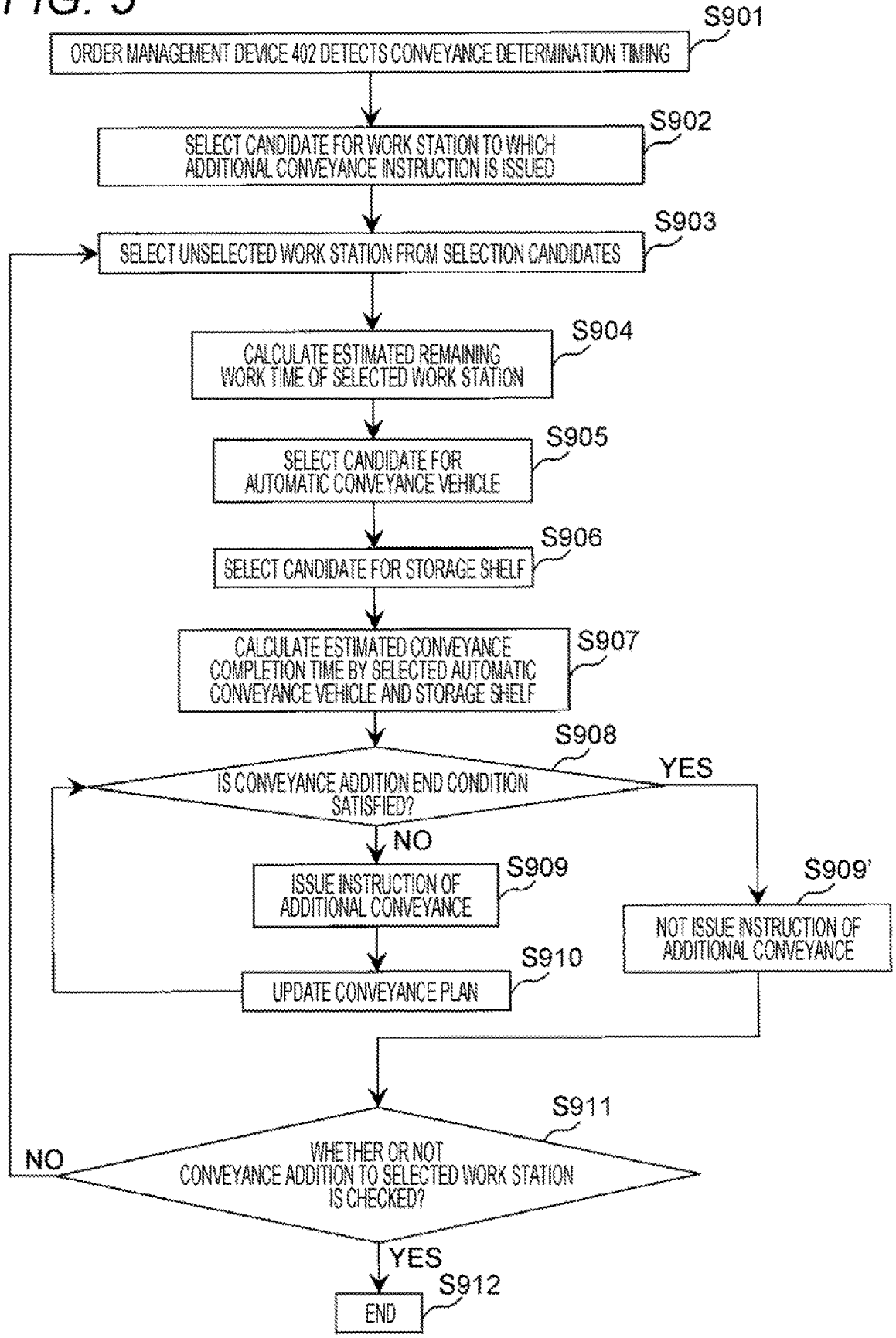
FIG. 5 is a flowchart showing an example of a process in which the operation management device determines conveyance of an additional storage shelf to be newly selected as a picking candidate in the work station after the start of delivery work according to the first embodiment of the present invention.

FIG. 5 is a flowchart showing an example of a process in which the operation management device 403 determines the conveyance of an additional storage shelf to be newly selected as a picking candidate in the work station after the start of the delivery work according to the first embodiment of the present invention.

An instruction to convey the storage shelf DS being a picking target to the automatic conveyance vehicle AC by the operation management device 403 to a certain work station WSi is planned by the order management device 402 detecting the conveyance determination timing (S901). In the present embodiment, for example, sorting completion timing can be adopted as the conveyance determination timing.

In the present embodiment, the sorting completion timing indicates the time at which the worker M takes out an article to a certain shipping destination from the storage shelf DS that has arrived at the work station WSi and sorts the article into the sorting shelf section. As an example, there is given such a system that, when the worker Mi presses a work completion button or the like included in the sorting destination display device Di for the picking work installed in the sorting shelf SS or the sorting gate, the order management device 402 detects the completion time of the sorting work as the sorting completion timing.

Further, the sorting completion timing can also be detected by pressing a work completion reply request button displayed on the display of the terminal Ti when the worker Mi completes the picking work of the delivery order. Furthermore, the worker Mi has a device that scans an article ID such as a handy terminal, and the sorting completion timing can also be detected in such a manner that the barcode or the RFID tag of the article that has been sorted to the shipping destination is read by the device to notify the completion of the process. In addition, as an example, it is also possible to detect the sorting completion timing by measuring the movement of the worker Mi putting the hand into the compartment when performing a sorting operation with a device such as a light curtain set in the sorting compartment.

As other conveyance determination timings, a take-out completion timing at which a product is taken out from the storage shelf DS may be adopted using a mechanism similar to the sorting completion timing detection function.

Alternatively, an interval timing generated by the warehouse management system 401, the order management device 402, or the operation management device 403 at certain time intervals may be adopted. Alternatively, a related timing obtained by adding a certain delay time based on the sorting completion timing or the take-out completion timing may be adopted.

Alternatively, a standby timing at which the automatic conveyance vehicle AC returns the storage shelf DS, which has been picked in the work station WSi, to the storage area, and the state of the automatic conveyance vehicle AC changes to a state where the next conveyance task can be instructed may be adopted. Alternatively, a recovery timing at which the state of the automatic conveyance vehicle AC returns to a state where the conveyance task of the storage shelf can be executed from the failure state or the low state of the driving battery may be adopted.

The conveyance determination timing is not limited to the above, and various timings can be adopted as the conveyance determination timing. For example, the timing at which a predetermined progress status is detected for the work in the work station WSi may be defined as the conveyance determination timing. The above-described sorting completion timing and other various timings are examples of timing at which a predetermined progress status is detected.

When the order management device 402 or the warehouse management system 401 detects the conveyance determination timing, the order management device 402 or the operation management device 403 determines whether or not to issue an instruction to perform the storage shelf conveyance by the automatic conveyance vehicle AC to the work station WS based on conveyance additional conditions. The operation management device 403 selects a candidate for the work station (S902), and determines whether or not to issue an instruction to perform the storage shelf conveyance to the candidate for a work station based on the conveyance additional condition.

As a candidate for the work station, all work stations WS may be selected, or a specific work station WS, for example, a work station WS that detects a sorting completion timing that is a conveyance determination timing may be selected. In the above example, the specific work station WS may be a plurality of work stations WS including a work station WS installed in proximity to the work station WS for which a sorting completion timing is detected.

FIG. 6 is an explanatory diagram showing an example of conveyance and picking instruction data 600 of storage shelves and sorting shelves of picking work in the first embodiment of the present invention.

This conveyance and picking instruction data 600 is information uniquely collecting IDs of the storage shelves having products necessary for delivery to the shipping destination and the number of the products, IDs of the sorting shelves on which the compartments, the number of products, and the shipping boxes corresponding to the shipping destinations are placed, and information on the compartments and the number of products. This information may be held in at least one of the storage device 702 of the computer 700 used as the order management device 402 or the storage device 502 of the computer 500 used as the operation management device 403, for example. Therefore, in the present embodiment, the order management device 402 determines in advance which storage shelf DS and which sorting shelf SS are picked, and after the operation management device 403 selects an automatic conveyance vehicle AC that conveys the storage shelf DS, the conveyance instruction is issued.

Specifically, the conveyance and picking instruction data 600 includes an ID 601, an article name 602, a number of articles 603, a storage shelf 604, a storage compartment stage 605, a storage compartment row 606, a sorting shelf 607, a sorting compartment stage 608, a sorting compartment row 609, and a shipping box 610.

The ID 601 identifies each record of the conveyance and picking instruction data 600. The article name 602 and the number of articles 603 indicate the item and the number of articles being targets for the picking work. A storage shelf 604 indicates a storage shelf DS in which the article is stored. The storage compartment stage 605 and the storage compartment row 606 indicate the number of stages and the number of rows of the compartment of the storage shelf DS in which the article is stored. The sorting shelf 607 indicates a sorting shelf SS as a sorting destination of the article. The sorting compartment stage 608 and the sorting compartment row 609 indicate the number of stages and the number of rows of the compartment as the sorting destination in the sorting shelf SS as the sorting destination of the article. The shipping box 610 indicates a shipping box as a sorting destination of the article.

For example, the top record in the example of FIG. 6 (ID is "1") instructs to pick 10 articles "A" stored in a compartment in the first row of the first stage of a storage shelf "DS1", and to sort the articles into a shipping box "SH01" placed in a compartment in the first row of the first stage of a sorting shelf SS1.

With reference to FIG. 5 again, creation of an additional conveyance instruction and determination of whether or not to output the instruction will be described. For example, when the conveyance of the storage shelf DS by the automatic conveyance vehicle AC to a certain work station WS is already planned, the operation management device 403 may calculate the estimated remaining work time of the picking work performed by a worker on the storage shelf DS and the estimated conveyance completion time to the work station WS of the storage shelf DS by the automatic conveyance vehicle AC, and may instruct the automatic conveyance vehicle AC to convey the storage shelf DS when the difference between the calculated estimated remaining work time and the conveyance completion time satisfies a predetermined condition. Details will be described below.

The operation management device 403 selects the work station WS for checking the addition of the storage shelf conveyance from the candidates for the work station WS selected in S902 (S903). As a method for determining the order of adding a conveyance instruction from the work station selected in S902, there is given, for example, a method for determining the order in ascending order from the work station WS with a short estimated remaining work time.

However, this method is only an example, and the order can be determined by a freely-selected method such as the order of ID numbers of work stations.

Next, the operation management device 403 calculates the estimated remaining work time of the selected work station WS (S904). This estimated remaining work time can be calculated from, for example, the time required for typical picking work per product, the number of articles to be picked, the number of orders, the storage position of the articles in the storage shelf DS, the position of the shipping box in the sorting shelf SS as a loading destination of the article, or the product size corresponding to the ID of each article recorded in the WMS 401 or the order management device 402. It is also possible to use information such as the ID and height of the worker Mi who is working in the work station WS to estimate the remaining work time. Further, the estimated remaining work time may include an arrival waiting time until the storage shelf DS is conveyed to the work station WS by the automatic conveyance vehicle AC.

If the estimated remaining work time is used when the order of adding the conveyance instruction is determined in S903 as described above, the same processing as S904 may be performed in S903. In that case, S904 may be omitted.

Next, the operation management device 403 selects a candidate for the automatic conveyance vehicle AC being a target for which the estimated conveyance completion time is calculated (S905). As an example, it is possible to calculate the estimated conveyance completion time for all automatic conveyance vehicles AC that can be controlled by the operation management device 403 as targets. That is, in that case, all automatic conveyance vehicles AC that can be controlled by the operation management device 403 are selected as candidates.

Alternatively, it is possible to select some automatic conveyance vehicles AC as a target for which the estimated conveyance completion time is calculated based on specific selection conditions. Some automatic conveyance vehicles AC based on specific selection conditions are, for example, automatic conveyance vehicles AC in a standby state that are not performing a conveyance operation, automatic conveyance vehicles AC that exist in some predetermined sections, all automatic conveyance vehicles AC that are not scheduled to be charged and are not being charged, automatic conveyance vehicles AC that are restored from the charged state, or automatic conveyance vehicles AC that satisfy a plurality of conditions combining these conditions.

Next, the operation management device 403 selects a candidate for the storage shelf DS as a target for which the estimated conveyance completion time is calculated by the automatic conveyance vehicle AC (S906). For example, all the storage shelves DS for which picking work is scheduled in the work station WS and for which the conveyance instruction by the automatic conveyance vehicle AC is not yet planned can be set as calculation targets.

Alternatively, storage shelves DS can also be selected based on specific selection conditions such as storage shelves DS that are not scheduled to be conveyed by the automatic conveyance vehicle AC and are arranged in the storage area, storage shelves DS that have been subjected to the picking work at a certain work station WS and being conveyed to the storage area without any other conveyance schedules, and storage shelves DS that satisfy a plurality of conditions obtained by combining these conditions.

The operation management device 403 calculates the estimated conveyance completion time when a certain automatic conveyance vehicle AC conveys a certain storage shelf DS to the work station WS for the combination of the automatic conveyance vehicle AC and the storage shelf DS selected based on the above selection conditions (S907). As an example, the estimated conveyance completion time during which a certain automatic conveyance vehicle AC conveys a certain storage shelf DS to the work station WS can be calculated by calculating the route from the present location to a destination based on the shortest route search algorithm such as Dijkstra method or A* method and using the traveling time from the movement start point to the arrival at the destination when traveling the above route based on the moving speed and acceleration of the automatic conveyance vehicle AC and the turning speed of the vehicle body.

In addition, the estimated conveyance completion time is calculated in consideration of, as necessary, the time for the automatic conveyance vehicle AC to lift the storage shelf DS in the placed state and the time for the storage shelf DS in a state of being lifted by the automatic conveyance vehicle AC to be placed. Further, the estimated conveyance completion time can also be calculated in consideration of these work times when the storage shelf DS being a target is being conveyed to another work station WS in accordance with another conveyance instruction at the time of calculation or when the storage shelf DS being a target is in the middle of the picking work in another work station WS in the conveyance destination.

As an example of another method for calculating the estimated conveyance completion time can also be calculated by machine-learning the movement data of the automatic conveyance vehicle AC in the past operation and inputting the operation state, position, destination of the automatic conveyance vehicle AC at the route search, the operation state of another automatic conveyance vehicle AC, and the arrangement state of the storage shelves DS in the area. As another example, there is given a method of managing as a data table the estimated moving time when the departure point, waypoint, and destination of the automatic conveyance vehicle AC are moved, updating the estimated moving time based on the time actually required for the automatic conveyance vehicle AC moving the route, and selecting a route that allows movement in the shortest time from this data table.

It is desirable that the operation management device 403 issues an instruction to perform the conveyance when an estimated conveyance completion time (also described as ECTT in the following description) calculated for a combination of a certain automatic conveyance vehicle AC and a certain storage shelf DS is smaller than the estimated remaining work time (also described as ERWT in the following description) in the work station WS, and when the difference between the ECTT and the ERWT is the smallest of the differences between the ECTT and the ERWT calculated for all combinations of the automatic conveyance vehicles AC and the storage shelves DS.

If the estimated conveyance completion time ECTT<the estimated remaining work time ERWT, there is a low possibility that the worker Mi in the work station WS may have a waiting time until the arrival of a certain storage shelf DS conveyed by a certain automatic conveyance vehicle AC. In addition, the difference between the estimated conveyance completion time ECTT and the estimated remaining work time ERWT being the minimum means that the conveyance completion time for conveying a certain storage shelf DS to another work station WS other than the work station WS may be minimized when the products on the storage shelf DS at the other work station Ws are picked.

That is, it is possible to plan the conveyance by selecting a combination of the automatic conveyance vehicle AC and the storage shelf DS so that the arrival waiting time of the storage shelf DS is not caused in both the work station WS and the another work stations WS. Based on the estimated remaining work time ERWT of the picking work in the work station WS and the estimated conveyance completion time ECTT of the storage shelf by the automatic conveyance vehicle which are described above, the operation management device 403 determines a storage shelf DS and an automatic conveyance vehicle AC to be newly conveyed to the work station WS.

In addition, when there is no combination of an automatic conveyance vehicle AC and a storage shelf DS that satisfies the estimated conveyance completion time ECTT<the estimated remaining work time ERWT, it is desirable that the operation management device 403 selects a combination of an automatic conveyance vehicle AC and a storage shelf DS that realizes the minimum estimated conveyance completion time ECTT. This is to minimize the waiting time before the start of picking that is caused until the arrival of the storage shelf DS for which the operation management device 403 issues a conveyance instruction in the work station WS.

FIG. 7 is an explanatory diagram showing an example of determination of the storage shelf DS to be conveyed based on the estimated remaining work time of the picking work in the work station WS and the estimated conveyance completion time by the automatic conveyance vehicle AC of the storage shelf DS as a conveyance candidate according to the first embodiment of the present invention.

The conveyance determination timing that triggers the determination shown in FIG. 7 is the sorting completion timing in the work station WS. In the example of FIG. 7, assuming that there are one automatic conveyance vehicle AC as a conveyance candidate and two storage shelves DS as conveyance candidates, specifically, the storage shelves DS1 and DS2, the respective estimated conveyance completion times are set to 20 seconds and 50 seconds. Further, in the example of FIG. 7, it is assumed that the estimated remaining work time of the work station WS at the time when the conveyance determination timing is detected is 100 seconds, 60 seconds, and 0 seconds.

When the estimated remaining work time is 100 seconds, the difference between the estimated remaining work time and the estimated conveyance completion time of the storage shelf as a conveyance candidate is 50 seconds even in the case of the storage shelf DS2. Therefore, even when the conveyance instruction is given to the storage shelf DS2, the storage shelf DS2 stays for 50 seconds without being picked around the work station WS as the conveyance destination. The storage shelves DS staying around the work station WS without being picked cause factors that may cause traffic jams that hinder the movement of other automatic conveyance vehicles AC.

In addition, when the storage shelf DS being conveyed is a picking target at another work station WS, after the picking work in the work station WS as the conveyance destination of the storage shelf DS being conveyed is completed, the storage shelf DS will be conveyed to the another work station WS. This may be a cause of the waiting time in another work station WS.

On the other hand, in the case of the storage shelf DS1, the difference between the estimated remaining work time and the estimated conveyance completion time of the storage shelf DS1 is 80 seconds, and a longer waiting time may be caused as compared to the case of the DS2 above.

Therefore, in this example, when the estimated remaining work time is 100 seconds, it is desirable that the operation management device 403 does not issue any instruction to convey the storage shelves DS1 and DS2.

When the estimated remaining work time is 60 seconds, the difference between the estimated remaining work time and the estimated conveyance completion time of the storage shelf DS2 is 10 seconds, and the difference between the estimated remaining work time and the estimated conveyance completion time of the storage shelf DS1 is 40 seconds. In this case, the operation management device 403 issues an instruction to convey the storage shelf DS2 that arrives 10 seconds before the remaining picking work is completed in the work station WS (that is, at the timing when the remaining picking work is likely to end).

If the operation management device 403 issues an instruction to convey the storage shelf DS1, even if the storage shelf DS1 arrives around the work station WS, there is a remaining work for 40 seconds, and hence it is necessary for the storage shelf DS1 to wait for the remaining work to be completed around the work station. In this waiting time, if the storage shelf DS1 may obstruct the passage of other automatic conveyance vehicles AC, the obstructed automatic conveyance vehicle AC waits for the movement of the automatic conveyance vehicle that is conveying the storage shelf DS1 or the automatic conveyance vehicle AC travels on the changed route instructed by the re-route search by the operation management device 403. With this, the movement to the destination is delayed, and as a result, the efficiency in the work station WS waiting for the arrival of the storage shelf conveyed by the another automatic conveyance vehicle AC is lowered.

On the other hand, as in the case of the storage shelf DS2 above, by issuing an instruction to convey the storage shelf DS with the difference between the conveyance time and the remaining work time being as short as possible, the conveyance which makes waiting time in the conveyance destination, which is its own destination, small can be performed while reducing the risk of traffic jams to another automatic conveyance vehicle AC.

When the estimated remaining work time is 0 seconds, such as at the start of system operation, it is desirable that the operation management device 403 instructs the automatic conveyance vehicle to convey the storage shelf DS1 with a short estimated conveyance completion time. This is because by issuing an instruction to convey the storage shelf DS1, the waiting time before the picking work in the work station WS as the conveyance destination is performed can be minimized.

In the above example, if there is at least one combination of an automatic conveyance vehicle AC and a storage shelf DS that satisfies the estimated conveyance completion time<the estimated remaining work time, the combination of a storage shelf DS and an automatic conveyance vehicle AC to be newly conveyed to the work station WS is always selected from combinations that satisfy the estimated conveyance completion time<the estimated remaining work time. However, an embodiment in which the combination having the smallest difference between the estimated conveyance completion time and the estimated remaining work time is selected regardless of whether or not the estimated conveyance completion time<the estimated remaining work time is satisfied is also an example of an embodiment of the present invention. Also in this embodiment, an effect of reducing the waiting time before the picking work is performed in the work station WS as the conveyance destination can be expected. However, the waiting time can be more reliably reduced by giving priority to a combination that satisfies the estimated conveyance completion time<the estimated remaining work time.

After the conveyance to the work station WS is determined, the operation management device 403 updates the estimated remaining work time of the determined work station WS as the conveyance destination. With this, the picking work time for the storage shelf DS determined to be conveyed is added to the estimated remaining work time. Furthermore, based on the updated estimated remaining work time, the operation management device 403 checks the conveyance addition end condition (S908).

In the present embodiment, as an example of the conveyance addition end condition, the total estimated remaining work time of the storage shelf DS that is determined to be conveyed is set so that it does not exceed the threshold time TH1. As another example, the conveyance addition end condition can be set so that the difference between the estimated conveyance completion time of the automatic conveyance vehicle AC and the estimated remaining work time does not exceed the threshold time TH2. Alternatively, when at least one of these conditions is satisfied, it may be determined that the conveyance addition end condition is satisfied. In the example of FIG. 7, an example that none of the storage shelves DS is selected when the estimated remaining work time is 100 seconds is an example in which the above-described conveyance addition end condition is satisfied.

In the former case, for example, the operation management device 403 calculates, regarding the storage shelf DS for which the estimated conveyance completion time is calculated in S907, the estimated remaining work time for the storage shelf DS when it is assumed that the conveyance is determined (for example, time until the picking work on the storage shelf DS is ended after the conveyance of the storage shelf DS to the work station WS is completed), and may determine that the conveyance addition end condition is satisfied when the estimated remaining work time exceeds the threshold time TH1.

Further, regarding these conveyance conditions, a conveyance addition end condition that differs depending on the state of the automatic conveyance vehicle AC as the candidate may be set. For example, it is also possible to set such that a conveyance instruction based on the threshold time TH1 is issued for an automatic conveyance vehicle AC without a conveyance instruction, and a conveyance instruction based on the TH2 is performed for an automatic conveyance vehicle AC performing other storage shelf conveyance.

Limiting the total estimated remaining work time of the storage shelves DS that are determined to be conveyed by, for example, the threshold time TH1 leads to prevention of work schedules from being concentrated on a specific work station WS, thereby contributing to improvement of the work efficiency of the entire system. In addition, limiting the difference between the estimated conveyance completion time and the estimated remaining work time of the automatic conveyance vehicle AC by, for example, the threshold time TH2 leads to prevention of too early arrival of the storage shelf DS at the work station WS and occurrence of traffic jams due to the early arrival, thereby contributing to the improvement of the work efficiency of the entire system.

If the conveyance addition end condition is not satisfied, the operation management device 403 plans conveyance by a combination of the automatic conveyance vehicle AC and the storage shelf DS as candidates (S909). Next, the operation management device 403 updates the estimated remaining work time of the work station WS as the conveyance destination based on the picking work on the storage shelf DS being a planned conveyance target (S910).

Thereafter, the operation management device 403 repeats the addition of the conveyance instruction to the same work station WS based on the updated estimated remaining work time until the conveyance addition end condition of S908 is satisfied. When the conveyance addition end condition in S908 is satisfied, the operation management device 403 completes the conveyance instruction addition to the work station WS without issuing an instruction to perform the additional conveyance (S909').

After the conveyance instruction addition of the storage shelf DS to a certain work station WS is completed, the operation management device 403 determines whether or not the addition of the conveyance instruction of the storage shelf for all the work stations WS selected as candidates in S902 is checked (that is, whether or not the processing of S903 to S910 has been completed for all the work stations WS) (S911).

If there is a work station WS that has not yet been checked, the operation management device 403 returns to S903, selects an unselected work station WS from the selection candidates, and adds a conveyance instruction for the storage shelf DS. On the other hand, when the additional check of the conveyance instruction of the storage shelf DS is completed for all the work stations WS selected as candidates in S902, an addition flow of a series of conveyance instructions is completed (S912).

Figure 8:
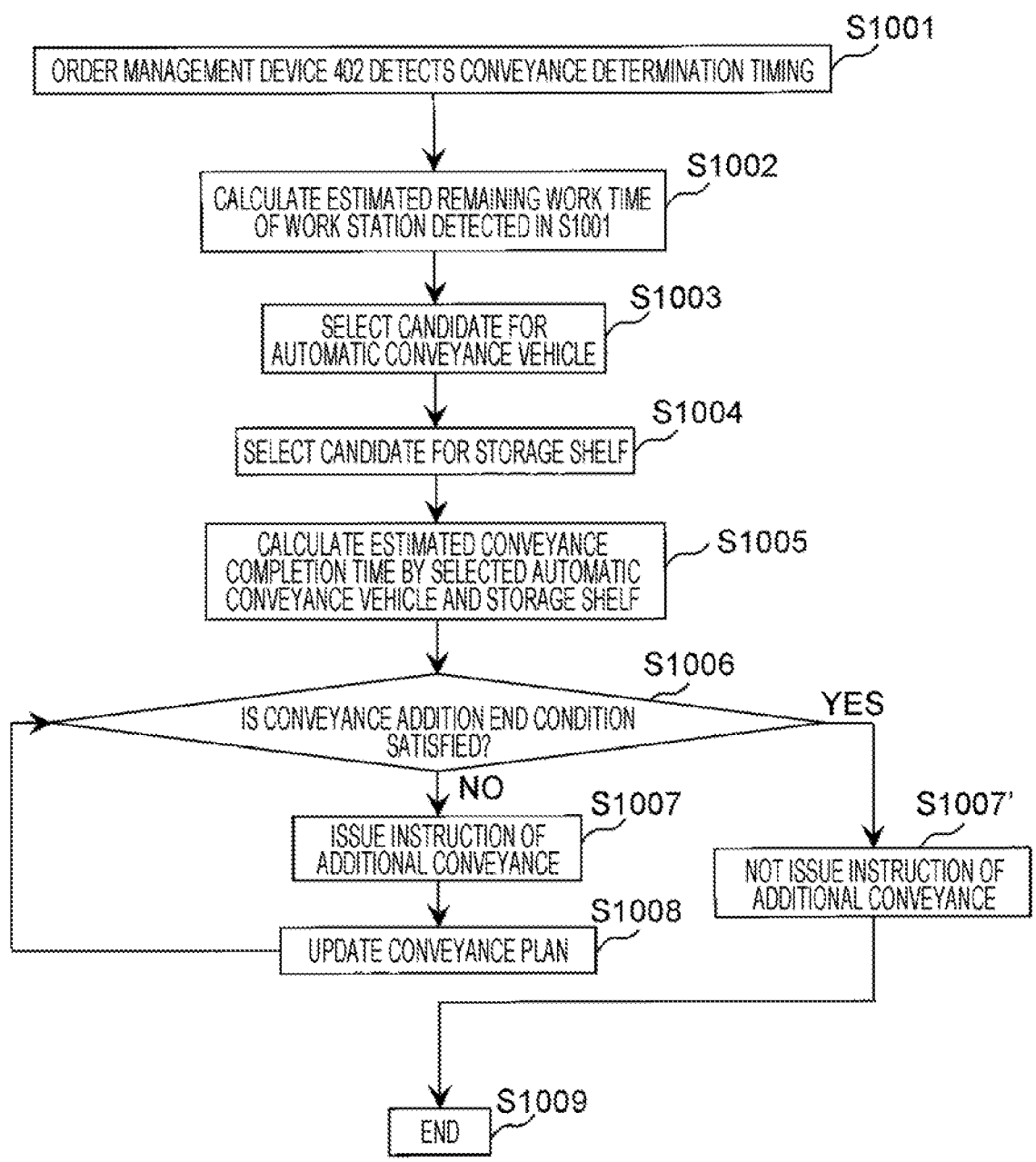
FIG. 8 is a flowchart showing an example of a process in which the operation management device determines additional conveyance of the storage shelf to be newly picked in the work station for which a conveyance determination timing is detected among work stations after the start of the delivery work according to the first embodiment of the present invention.

FIG. 8 is a flowchart showing an example of a process in which the operation management device 403 determines the additional conveyance of the storage shelf DS to be newly picked in the work station WS for which the conveyance determination timing is detected among the work stations WS after the start of the delivery work according to the first embodiment of the present invention.

Unlike the flow described in FIG. 5, the flow in FIG. 8 does not require the steps of the selection (S902) and selections (S903 and S911) of the work station WS for which the conveyance addition is confirmed, and whether or not the conveyance addition of the storage shelf DS is required needs to be confirmed only for the work station WS for which the conveyance determination timing is detected.

Since S1001 in FIG. 8 corresponds to S901 in FIG. 5 and S1001 to S1008 correspond to S904 to S910 in FIG. 5, respectively, description of these steps is omitted.

Second Embodiment

Next, a second embodiment of the present invention will be described. Except for the differences described below, each part of a conveyance system of the second embodiment has the same function as each part denoted by the same reference numeral in the first embodiment shown in FIGS. 1 to 8, and hence description thereof is omitted.

Figure 9:
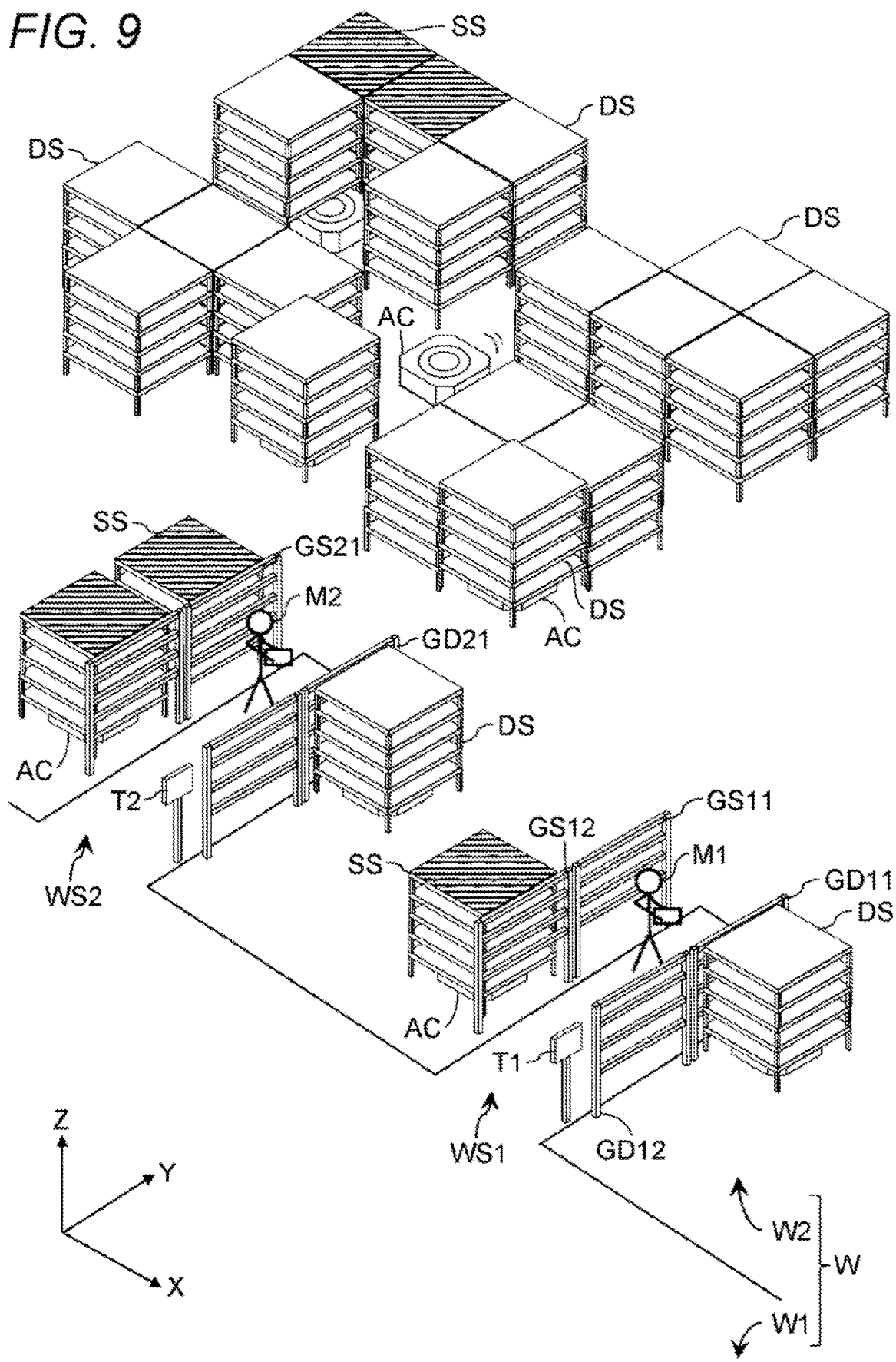
FIG. 9 is an overall schematic view of a conveyance system according to a second embodiment of the present invention.

FIG. 9 is an overall schematic view of the conveyance system according to the second embodiment of the present invention.

Similarly to the first embodiment, a warehouse W has a work area W1 and an article storage area W2.

In the present embodiment, a sorting shelf SS can also be conveyed by an automatic conveyance vehicle. For example, the sorting shelf SS is a shelf having the same size as a storage shelf DS. However, the sorting shelf SS may be different from the storage shelf DS in the way of dividing the compartment.

The sorting shelf SS is managed in the same manner as the storage shelf DS, and is arranged in the article storage area, for example, like the storage shelf DS. Of the shelves that are arranged, the usage of the shelves that are not loaded with products may not be determined. In that case, it is possible to employ an operation that, for example, depending on the operation status of the system, an order management device 402 or an operation management device 403 determines whether to use the shelf as a storage shelf DS or a sorting shelf SS each time.

Both the storage shelf DS for picking up products by picking work and the sorting shelf SS for loading products are conveyed to the work station WS. As an example, the picking work in the work station WS may be started at a timing when both the storage shelf DS from which products are taken out and the sorting shelf SS to which products are loaded are gathered in the work station WS.

Further, when the storage shelf DS arrives first, the order management device 402 can issue a picking work instruction to perform only the product take-out work first. The sorting shelf SS to which products are loaded in the work station WS can be operated by a worker in both a state of being lifted or a state of being placed on the floor when being conveyed by an automatic conveyance vehicle AC during picking work.

The overall configuration of a conveyance system 400, and the hardware configurations of the operation management device 403 and the order management device 402 of the conveyance system 400 can take the same configurations as those of the first embodiment as an example, and are configured as shown in FIGS. 1 to 4A and 4B, for example.

In the present embodiment, since the sorting shelf SS is also conveyed by the automatic conveyance vehicle AC, a gate similar to the gate provided at the arrival location of the storage shelf DS in the work station WS of the first embodiment is also provided at the arrival location of the sorting shelf SS. As an example, at the gate on the storage shelf DS side, a compartment for taking out products, a display device for the number of products to be taken out, and a button for confirming completion of product take-out may be installed. On the other hand, at the gate on the sorting shelf SS side, a loading compartment of products, a display device for the number of products to be loaded, and a button for confirming completion of loading products may be installed. With these devices, it is possible to extract information, for example, whether or not the take-out or loading of the products is completed.

Figure 10:
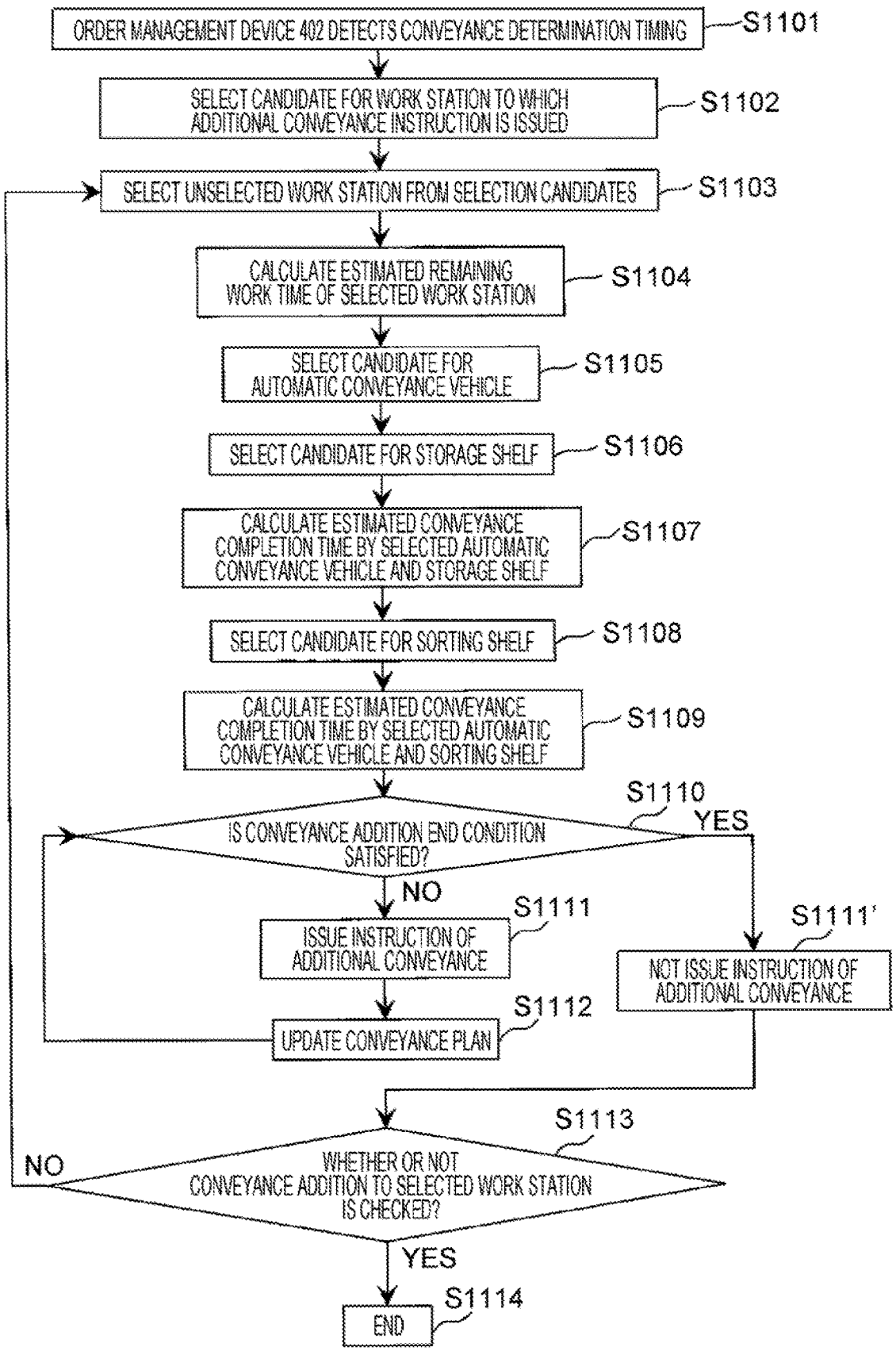
FIG. 10 is a flowchart showing an example of a process in which the operation management device determines conveyance of an additional storage shelf to be newly selected as a picking candidate in the work station after the start of delivery work according to the second embodiment of the present invention.

FIG. 10 is a flowchart showing an example of a process in which the operation management device 403 determines the conveyance of an additional storage shelf DS to be newly selected as a picking candidate in the work station WS after the start of the delivery work according to the second embodiment of the present invention.

The flow shown in FIG. 10 is the same as the flow of FIG. 5 in the first embodiment except for S1108 and S1109. Specifically, S1101 to S1107 are equivalent to S901 to S907 in FIG. 5, respectively, and S1110 to S1114 are equivalent to S908 to S912 in FIG. 5, respectively.

The estimated conveyance completion time in the second embodiment is, for example, the time required for a certain storage shelf DS and a certain sorting shelf SS to be conveyed to the work station WS by a certain automatic conveyance vehicle AC and the both shelves to be gathered (note that, the storage shelf DS and the sorting shelf SS may be conveyed by different automatic conveyance vehicles AC, or may be conveyed sequentially by one automatic conveyance vehicle AC). That is, of the estimated conveyance completion time of the storage shelf DS and the estimated conveyance completion time of the sorting shelf SS, the longer estimated conveyance time is set as the estimated conveyance completion time of the storage shelf DS and the sorting shelf SS.

Therefore, in the present embodiment, it is necessary to select a sorting shelf SS as a conveyance candidate, and calculate an estimated conveyance completion time to the work station WS by a combination of the sorting shelf SS as a candidate and an automatic conveyance vehicle AC as a candidate. For this reason, steps S1108 and S1109 are set in FIG. 10. In S1110, the longer one of the estimated conveyance completion time calculated in S1107 and the estimated conveyance completion time calculated in S1109 is compared with the estimated remaining work time.

Further, the additional conveyance instruction issued in S1111 includes a conveyance instruction of the automatic conveyance vehicle AC related to both the storage shelf DS and the sorting shelf SS.

The conveyance and picking instruction data of the storage shelf and the sorting shelf of the picking work in the present embodiment are also constituted by information equivalent to that in the first embodiment, and for example, the data shown in FIG. 6 can be used. That is, also in the present embodiment, the order management device 402 associates in advance the correspondence for the picking work between the storage shelves DS and the sorting shelves SS, and issues an conveyance instruction after selecting the automatic conveyance vehicle AC that conveys the storage shelf DS to the work station WS and the automatic conveyance vehicle AC that conveys the sorting shelf SS to the work station WS.

The determination of whether or not to create an additional conveyance instruction and to output the instruction in the present embodiment is performed as follows, for example. That is, when the conveyance of the storage shelf DS and the sorting shelf SS by the automatic conveyance vehicles AC to a certain work station WS is already planned, the operation management device 403 may calculate the estimated remaining work time of the picking work performed by a worker on the storage shelf DS and the sorting shelf SS and the estimated conveyance completion time to the work station WS of the storage shelf DS and the sorting shelf SS by the automatic conveyance vehicles AC, and may instruct the automatic conveyance vehicles AC to convey the storage shelf DS and the sorting shelf SS when the difference between the calculated estimated remaining work time and the conveyance completion time satisfies a predetermined condition.

FIG. 11 is an explanatory diagram showing an example of determination of the storage shelf DS and the sorting shelf SS to be conveyed based on the estimated remaining work time of the picking work in the work station WS and the estimated conveyance completion time by the automatic conveyance vehicles AC of the storage shelf DS and the sorting shelf SS as conveyance candidates according to the second embodiment of the present invention.

The conveyance determination timing that triggers the determination shown in FIG. 11 is the sorting completion timing in the work station WS. In FIG. 11, assuming that there are two automatic conveyance vehicles AC as conveyance candidates and two storage shelves as conveyance candidates, specifically, the storage shelves DS1 and DS2, the estimated conveyance completion times are set to 20 seconds and 50 seconds, respectively. Further, assuming that there are two shelves, specifically, sorting shelves SS1 and SS2 that store shipping boxes into which products taken out from the storage shelves DS1 and DS2 are loaded, the estimated conveyance times are set to 10 seconds and 90 seconds, respectively.

In the example of FIG. 11, it is assumed that the estimated remaining work time of the work station WS at the time when the conveyance determination timing is detected is 100 seconds, 60 seconds, and 0 seconds.

First, consideration is made of the case where the estimated remaining work time is 100 seconds. The difference between the estimated remaining work time and the estimated conveyance completion time of the shelf as the conveyance candidate is 90 seconds when the storage shelf DS1 and the sorting shelf SS2 are conveyed. This is because the estimated conveyance completion time (90 seconds) of the sorting shelf SS2 is longer than the estimated conveyance time (20 seconds) of the storage shelf DS1, and it takes 90 seconds for both shelves to be gathered in the work station WS as the conveyance destination.

In this case, the estimated remaining work time (100 seconds) is longer than the estimated conveyance completion time (90 seconds) of the storage shelf DS1 and the sorting shelf SS2, and the difference between the two is 10 seconds. Therefore, when the storage shelf DS1 and the sorting shelf SS2 are conveyed, the arrival waiting time of a shelf is not caused in the work station WS, and the waiting time for the sorting shelf SS2 to wait for completion of the picking work for another shelf in the work station WS is as short as 10 seconds, and there is little concern that it will hinder the conveyance of another shelf and cause traffic jams. Therefore, in the example of FIG. 11, when the estimated remaining work time is 100 seconds, it is desirable that the operation management device 403 issues an instruction to convey the sorting shelf SS2.

On the other hand, regarding the storage shelves DS, the estimated conveyance completion times (20 seconds and 50 seconds, respectively) of the storage shelves DS1 and DS2 are both shorter than the estimated conveyance completion time (90 seconds) of the sorting shelf SS2.

For this reason, no matter which is selected, the arrival waiting time of a shelf is not caused in the work station WS. However, the waiting time for the storage shelves DS1 and DS2 to wait for completion of the picking work for another shelf after the storage shelves DS1 and DS2 arrive at the work station WS are 80 seconds and 50 seconds, respectively. As this waiting time becomes longer, the concern about the occurrence of traffic jams by inhibiting the conveyance of another shelf is increased, and the time during which another work station WS cannot use the shelf becomes longer. For this reason, it is desirable that the operation management device 403 issues an instruction to convey the storage shelf DS2.

Next, consideration is made of the case where the estimated remaining work time is 60 seconds. When the storage shelf DS2 and the sorting shelf SS1 are conveyed, the estimated conveyance completion time is 50 seconds, which is longer one of the estimated conveyance completion time (50 seconds) of the storage shelf DS2 and the estimated conveyance completion time (10 seconds) of the sorting shelf SS1. For this reason, the difference between the estimated conveyance completion time (50 seconds) and the estimated remaining work time (60 seconds) is 10 seconds.

Also in this case, since the estimated remaining work time (60 seconds) is longer than the estimated conveyance completion time (50 seconds) and the difference between the two is as small as 10 seconds, it is desirable that the operation management device 403 issue an instruction to convey the storage shelf DS2 and the sorting shelf SS1. With this, the waiting time is reduced at the conveyance destination and another work station due to the same effect as when the estimated remaining work time is 100 seconds, and there is little concern that it will hinder the conveyance of another shelf and cause traffic jams.

When the estimated remaining work time is 0 seconds, such as at the start of a system operation, it is desirable that the operation management device 403 instructs the automatic conveyance vehicle to convey the storage shelf and the sorting shelf with the minimum estimated conveyance completion time in order to minimize the waiting time at the conveyance destination. That is, the operation management device 403 can realize the minimum waiting time by issuing an instruction to convey the storage shelf DS1 and the sorting shelf SS1 with the minimum estimated conveyance completion time (20 seconds and 10 seconds, respectively).

As described above, when there are a plurality of combinations of the storage shelf DS and the sorting shelf SS as candidates, it is desirable that the operation management device 403 selects a combination with the smallest difference between the longer estimated conveyance completion time and the estimated remaining work time and to issue an instruction to convey these shelves. With this, the waiting time for the picking work can be reduced, and the work efficiency is improved. At this time, it is more preferable that the operation management device 403 selects a combination in which a longer estimated conveyance completion time is shorter than the estimated remaining work time. With this, the waiting time for the picking work can be more reliably reduced. In addition, if there are a plurality of combinations of the storage shelf DS and the sorting shelf SS that satisfy such conditions, it is desirable to select a combination with the smallest difference between the estimated conveyance completion time of the storage shelf DS and the estimated conveyance completion time of the sorting shelf SS among the plurality of combinations. With this, the waiting time of a shelf can be reduced.

Although the two embodiments, specifically, the first embodiment and the second embodiment have been described above, the effects of the present invention are also effective with respect to other embodiments. For example, a form in which the first embodiment and the second embodiment are mixed, that is, a conveyance system configured by the work area W1 including a work station WS having a sorting shelf SS fixed to the floor and a work station WS having a sorting shelf SS that can be conveyed by an automatic conveyance vehicle AC, or a conveyance system in which one shelf simultaneously plays a role in both storage and sorting of products can be considered. Even in such a conveyance system, the conveyance instruction method based on the difference between the estimated remaining work time of the work station WS and the estimated conveyance completion time of the shelf by the automatic conveyance vehicle AC according to the present invention can reduce the waiting time of the work station WS.

As described in the above plurality of embodiments, by instructing the automatic conveyance vehicle to convey the storage shelf with the optimal moving time for the estimated remaining work time of the picking work, the arrival waiting time of the storage shelf DS in the work station WS as the conveyance destination is reduced, and the waiting time at another work station WS that requires the same storage shelf DS is reduced, so that the effect of improving productivity can be obtained.

The representative examples of the aspects of the present invention described above are summarized as follows. That is, there is provided an article conveyance system including: a processor (for example, processor 501 or 701); and a storage device (for example, storage device 502 or 702) accessed by the processor, in which the processor calculates a conveyance time (for example, estimated conveyance completion time) until a conveyance device (for example, automatic conveyance vehicle AC) conveys a shelf (for example, storage shelf DS or sorting shelf SS) being a target for work of taking out or storing an article to a work place (for example, work station WS) where the work on the shelf is performed and a work time (for example, estimated remaining work time) until work scheduled to be performed at the work place is ended; and the processor determines whether or not to add an instruction to cause the conveyance device to convey the shelf to the work place based on a difference between the conveyance time and the work time (for example, S908, S1006, or S1110).

With this, the arrival timing of the shelf at the work station as a conveyance destination is adjusted, so that the productivity can be improved.

At this time, the processor may start a process of determining whether or not to add an instruction to cause the conveyance device to convey the shelf to the work place when the processor detects a predetermined progress status of the work scheduled to be performed at the work place (for example, detection of the conveyance determination timing in S901).

With this, it is possible to provide an appropriate trigger for executing the processing.

Further, the processor may select at least one of a plurality of work places as a candidate; and the processor may execute, for each of the work places selected as a candidate, the process of determining whether or not to add an instruction to cause the conveyance device to convey the shelf to the work place (for example, S902).

Specifically, for example, the processor may select, as the candidate, from the plurality of work places, the work place where a predetermined progress status of the work scheduled to be performed at the work place is detected, or the work place where the predetermined progress status of the work scheduled to be performed at the work place is detected and one or more work places in proximity thereof.

With this, it is possible to select an appropriate work place as an addition target for a conveyance instruction.

Further, the storage device may hold identification information and the number of articles taken out from or stored in each of the shelves (for example, FIG. 6), and the processor may calculate the work time based on at least any one of a type of the articles to be taken out from or stored in each of the shelves, the number of the types, and the number of the articles (for example, S904).

With this, the work time can be calculated with high accuracy.

Further, the processor may calculate the conveyance time based on a current position of the conveyance device and a position of the work place (for example, S907).

With this, the conveyance time can be calculated with high accuracy.

In addition, the processor may calculate the work time and the conveyance time for a plurality of combinations of a conveyance device selected from a plurality of the conveyance devices and a shelf selected from a plurality of the shelves; and the processor may determine to add an instruction to cause the conveyance device to convey the shelf to the work place for a combination of the conveyance device and the shelf for which an absolute value of a difference between the work time and the conveyance time is minimum (for example, S908 and S909).

With this, the arrival waiting time of the shelf in the work station as a conveyance destination is reduced, and the waiting time at another work station that requires the same shelf is also reduced, thereby improving productivity.

In addition, the processor may determine to add an instruction to cause the conveyance device to convey the shelf to the work place for the combination for which the absolute value of the difference between the work time and the conveyance time is minimum among combinations of the conveyance device and the shelf for which the work time is longer than the conveyance time (for example, S908 and S909).

With this, the arrival waiting time of the shelf in the work station as a conveyance destination is eliminated, and the waiting time at another work station that requires the same shelf is also reduced, thereby improving productivity.

The plurality of shelves may include a plurality of storage shelves (for example, storage shelves DS) from which an article is taken out by work performed at the work place; and the conveyance time may be a time for the conveyance device to convey each of the storage shelves to the work place.

With this, for example, as shown in the first embodiment, the present invention can be applied to a warehouse or the like in which a storage shelf is conveyed.

In addition, the plurality of shelves may include a plurality of storage shelves (for example, storage shelves DS) from which an article is taken out by work performed at the work place, and a plurality of sorting shelves (for example, sorting shelves SS) in which the article is stored by the work; and the conveyance time may be longer one of a time until the conveyance device conveys each of the storage shelves to the work place and a time until the conveyance device conveys the sorting shelf to the work place (for example, S1107, S1109, and S1110).

With this, for example, as shown in the second embodiment, the present invention can be applied to a warehouse or the like in which both of a storage shelf and a sorting shelf are conveyed.

In addition, the processor may determine to add an instruction to cause the conveyance device to convey the shelf to the work place for a combination for which the absolute value of the difference between the work time and the conveyance time is minimum among combinations of the conveyance device, the storage shelf, and the sorting shelf for which the work time is longer than the conveyance time; and when there are a plurality of combinations of the conveyance device, the storage shelf, and the sorting shelf for which the absolute value of the difference between the work time and the conveyance time is minimum among combinations of the conveyance device, the storage shelf, and the sorting shelf for which the work time is longer than the conveyance time, the processor may determine to add an instruction to cause the conveyance device to convey the shelf to the work place for a combination for which a difference between a time until the conveyance device conveys the storage shelf to the work place and a time until the conveyance device conveys the sorting shelf to the work place is minimum among the plurality of combinations for which the absolute value of the difference between the work time and the conveyance time is minimum (for example, a case where the estimated remaining work time of 100 seconds in FIG. 11).

With this, even when there is a difference between the conveyance time of the storage shelf and the conveyance time of the sorting shelf, an appropriate combination that improves the work efficiency can be selected.

Further, the processor may determine whether or not a predetermined end condition is satisfied based on at least the work time, and when the end condition is satisfied, the processor may not add an instruction to cause the conveyance device to convey the shelf to the work place (for example, S908).

Specifically, for example, the end condition may be, when it is assumed that the conveyance device adds an instruction to cause the conveyance device to convey the shelf to the work place, at least one of a condition that a time until work on the shelf ends exceeds a first threshold value (for example, threshold time TH1) and a condition that the difference between the work time and the conveyance time exceeds a second threshold value (for example, threshold time TH2).

This prevents work schedules from being concentrated on a specific work station and prevents the shelf that has arrived at the work station from waiting for a long time to start work, thereby improving the work efficiency.

The present invention is not limited to the embodiments described above, but include various modifications.

For example, the above-described embodiments have been described in detail for better understanding of the present invention, and the present invention is not necessarily limited to those having all the configurations described above. Further, a part of the configuration of one embodiment can be replaced with the configuration of another embodiment, and the configuration of another embodiment can be added to the configuration of one embodiment. In addition, it is possible to add, delete, and replace other configurations for a part of the configuration of each embodiment.

Each of the above-described configurations, functions, processing units, processing means, and the like may be realized by hardware by designing a part or all of them with, for example, an integrated circuit. Further, each of the above-described configurations, functions, and the like may be realized by software by interpreting and executing a program that realizes each function by the processor. Information such as programs, tables, and files that realize each function can be stored in a storage device such as non-volatile semiconductor memories, hard disk drives, or SSDs (Solid State Drives), or a computer readable non-transitory data storage medium such as IC cards, SD cards, or DVDs.

Further, only the control lines and information lines that are considered necessary are given, and all the control lines and information lines are not necessarily given for the product. Actually, it may be considered that almost all the components are connected to each other.

What is claimed is:

1. An article conveyance system comprising:
   a processor; and
   a storage device accessed by the processor,
   wherein the processor calculates a conveyance time until a conveyance device conveys a shelf being a target for work of taking out or storing an article to a work place where the work on the shelf is performed and a work time until work scheduled to be performed at the work place is ended; and
   the processor determines whether or not to add an instruction to cause the conveyance device to convey the shelf to the work place based on a difference between the conveyance time and the work time.

2. The article conveyance device according to claim 1, wherein
   the processor starts a process of determining whether or not to add an instruction to cause the conveyance device to convey the shelf to the work place when the processor detects a predetermined progress status of the work scheduled to be performed at the work place.

3. The article conveyance device according to claim 1, wherein
   the processor selects at least one of a plurality of the work places as a candidate; and
   the processor executes, for each of the work places selected as a candidate, the process of determining whether or not to add an instruction to cause the conveyance device to convey the shelf to the work place.

4. The article conveyance system according to claim 3, wherein
   the processor selects, as the candidate, from the plurality of work places, the work place where a predetermined progress status of the work scheduled to be performed at the work place is detected, or the work place where the predetermined progress status of the work scheduled to be performed at the work place is detected and one or more work places in proximity thereof.

5. The article conveyance system according to claim 1, wherein
   the storage device holds identification information and the number of articles taken out from or stored in each of the shelves, and
   the processor calculates the work time based on at least any one of a type of the articles to be taken out from or stored in each of the shelves, the number of the types, and the number of the articles.

6. The article conveyance system according to claim 1, wherein the processor calculates the conveyance time based on a current position of the conveyance device and a position of the work place.

7. The article conveyance system according to claim 1, wherein
   the processor calculates the work time and the conveyance time for a plurality of combinations of a conveyance device selected from a plurality of the conveyance devices and a shelf selected from a plurality of the shelves; and
   the processor determines to add an instruction to cause the conveyance device to convey the shelf to the work place for a combination of the conveyance device and the shelf for which an absolute value of a difference between the work time and the conveyance time is minimum.

8. The article conveyance system according to claim 7, wherein
   the processor determines to add an instruction to cause the conveyance device to convey the shelf to the work place for the combination for which the absolute value of the difference between the work time and the conveyance time is minimum among combinations of the conveyance device and the shelf for which the work time is longer than the conveyance time.

9. The article conveyance system according to claim 7, wherein
   the plurality of shelves include a plurality of storage shelves from which an article is taken out by work performed at the work place; and
   the conveyance time is a time for the conveyance device to convey each of the storage shelves to the work place.

10. The article conveyance system according to claim 7, wherein
    the plurality of shelves include a plurality of storage shelves from which an article is taken out by work performed at the work place, and a plurality of sorting shelves in which the article is stored by the work; and
    the conveyance time is longer one of a time until the conveyance device conveys each of the storage shelves to the work place and a time until the conveyance device conveys the sorting shelf to the work place.

11. The article conveyance device according to claim 10, wherein
    the processor determines to add an instruction to cause the conveyance device to convey the shelf to the work place for a combination for which the absolute value of the difference between the work time and the conveyance time is minimum among combinations of the conveyance device, the storage shelf, and the sorting shelf for which the work time is longer than the conveyance time; and
    when there are a plurality of combinations of the conveyance device, the storage shelf, and the sorting shelf for which the absolute value of the difference between the work time and the conveyance time is minimum among combinations of the conveyance device, the storage shelf, and the sorting shelf for which the work time is longer than the conveyance time, the processor determines to add an instruction to cause the conveyance device to convey the shelf to the work place for a combination for which a difference between a time until the conveyance device conveys the storage shelf to the work place and a time until the conveyance device conveys the sorting shelf to the work place is minimum among the plurality of combinations for which the absolute value of the difference between the work time and the conveyance time is minimum.

12. The article conveyance system according to claim 1, wherein
the processor determines whether or not a predetermined end condition is satisfied based on at least the work time, and when the end condition is satisfied, the processor does not add an instruction to cause the conveyance device to convey the shelf to the work place.

13. The article conveyance system according to claim 12, wherein
the end condition is, when it is assumed that the conveyance device adds an instruction to cause the conveyance device to convey the shelf to the work place, at least one of a condition that a time until work on the shelf ends exceeds a first threshold value and a condition that the difference between the work time and the conveyance time exceeds a second threshold value.

14. An article conveyance method executed by a computer system including a processor and a storage device accessed by the processor, the method comprising:
a procedure of causing the processor to calculate a conveyance time until a conveyance device conveys a shelf being a target for work of taking out or storing an article to a work place where the work on the shelf is performed and a work time until work scheduled to be performed at the work place is ended; and
a procedure of causing the processor to determine whether or not to add an instruction to cause the conveyance device to convey the shelf to the work place based on a difference between the conveyance time and the work time.

* * * * *